United States Patent
Bhat et al.

[11] Patent Number: 5,510,094
[45] Date of Patent: Apr. 23, 1996

[54] AMMONIA-LIMESTONE SCRUBBING WITH BY-PRODUCT FOR USE IN AGRICULTURE

[75] Inventors: Pervaje A. Bhat, North Canton; Dennis W. Johnson, Barberton, both of Ohio

[73] Assignee: The Babcock & Wilcox Company, New Orleans, La.

[21] Appl. No.: 372,274

[22] Filed: Jan. 11, 1995

Related U.S. Application Data

[63] Continuation-in-part of Ser. No. 28,892, Mar. 8, 1993, abandoned.

[51] Int. Cl.$^6$ .................................................. C01B 17/20
[52] U.S. Cl. ........................... 423/243.07; 423/243.11; 423/547; 423/555
[58] Field of Search ..................... 423/243.06, 243.11, 423/547, 555

[56] References Cited

U.S. PATENT DOCUMENTS

| | | | |
|---|---|---|---|
| 4,231,995 | 11/1980 | Campbell et al. | 423/243.06 |
| 4,250,160 | 2/1981 | Eakman | 423/243.06 |
| 4,690,807 | 9/1987 | Saleem | 423/243.06 |
| 4,832,936 | 5/1989 | Holter et al. | 423/555 |
| 5,017,349 | 5/1991 | Davis et al. | 423/243.06 |
| 5,051,245 | 9/1991 | Wilson et al. | 423/243.11 |

FOREIGN PATENT DOCUMENTS

| | | | |
|---|---|---|---|
| 4840691 | 6/1973 | Japan | 423/243.06 |

*Primary Examiner*—Ferris Lander
*Attorney, Agent, or Firm*—Robert J. Edwards; Michael L. Hoelter

[57] ABSTRACT

A method of wet flue gas desulfurization of combustion gases that incorporates both calcium scrubbing with forced oxidation and ammonia scrubbing of the gas in a scrubber tower. The end product or result from such a process is gypsum and ammonia sulfate which may be used in agriculture.

12 Claims, 1 Drawing Sheet

AMMONIA-LIMESTONE SCRUBBING WITH BY-PRODUCT FOR USE IN AGRICULTURE

This is a continuation-in-part of application Ser. No. 08/028,892 filed Mar. 8, 1993, now abandoned.

FIELD OF THE INVENTION

This invention pertains to the wet scrubbing of a sulfur containing flue gas and more particularly to the use of both ammonia and limestone as reagents in different stages of a scrubber tower, along with forced oxidation, to remove the sulfur therefrom.

BACKGROUND OF THE INVENTION

Generally, flue gas desulfurization (FGD) systems can be categorized as being either a dry system or a wet system. Dry systems collect a dry pollutant from the exiting gas stream such as by the use of mechanical collectors, fabric filters or the like. Wet systems produce a liquid slurry that must be further dewatered before the end product and/or pollutant can be disposed of. Because of the close contact between the pollutant and the liquid slurry in wet systems, additional process functions can also be performed than is possible with dry systems. These functions include gas absorption, chemical reaction and heat transfer along with the simultaneous removal of dust and gaseous pollutants by use of a suitable scrubbing solution.

In perhaps the majority of wet scrubbing systems, the scrubbing solution is calcium based (such as lime, limestone, or slaked lime). In others it may be magnesium or sodium based, or even ammonia based, depending upon the pollutant to be removed and the costs involved. Additionally, it is common to supply additives or catalysts to the scrubber tower to further enhance sulfur removal.

However, despite the variety of systems available, it has not heretofore been known that certain such systems may be combined to further improve the operation of the scrubber tower. By such a combination, the advantages of one system are used to overcome the disadvantages of the other system. Consequently, not only is a greater percentage of the sulfur or other contaminants removed, but such removal is accomplished at a lower cost and greater efficiency. Additionally, the end product of such a system need not be sent to a landfill for disposal, instead the end product can be utilized in other industries thereby possibly generating revenue rather than being an expense.

It is thus an object of this invention to combine calcium and ammonia based reagents in a wet scrubber tower to promote a high degree of sulfur removal from the flue gas. Another object of this invention is to implement forced oxidation in the scrubber tower to convert $SO_3$ (sulfite) to $SO_4$ (sulfate) for subsequent combination with calcium to formulate gypsum ($CaSO_4 \cdot 2H_2O$). Yet another object of this invention is to utilize ammonia to generate an end product that is useful in agriculture such as a soil stabilizer or fertilizer. Such agricultural product may be in wet or dry form depending on its use. Still another object of this invention is to utilize the lower cost limestone rather than the more expensive lime as the calcium source in the scrubber solution. Yet another object of this invention is to reduce corrosion in the scrubber tower by maintaining a higher pH therein. Another object of this invention is to employ a system that can be used in a spray tower or a tray tower either of which may be of a single or dual loop design. Still another object of this invention is to provide a staged tray tower wherein the top stage or section consists predominantly of an ammonia scrubbing loop. A further object of this invention is to increase the $SO_2$ removal efficiency of 95% or more by using an $NH_3$ additive in lime/limestone scrubbing at higher pH levels of 5.5–6.0 instead of lower pH levels of 4.5–5.0 for buffered systems using organic additives in a tray tower. These and other objects and advantages of this invention will become obvious upon further investigation.

SUMMARY OF THE INVENTION

What is disclosed is a method of wet flue gas desulfurization that includes the steps of injecting an ammonia based reagent into a scrubber tower through which a sulfur containing flue gas flows. A bottoms product collects in the lower region of this scrubber tower which is subject to forced oxidation. Afterwards, this oxidized bottoms product is delivered to a dewatering assembly where a calcium based reagent is mixed therewith. (Alternatively, this calcium based reagent may be supplied directly to the scrubber tower.) This dewatering assembly generates a liquid stream containing un-used or under utilized reagent therein and a separate solid/slurry stream containing gypsum and ammonia sulfate compounds. The liquid stream is returned to the tower and sprayed onto the flue gas while the solid/slurry stream is sent for further concentration for the removal therefrom of the gypsum and ammonium sulfate compounds.

BRIEF DESCRIPTION OF THE DRAWING

Sole

DETAILED DESCRIPTION OF THE DRAWING

Figure 1:
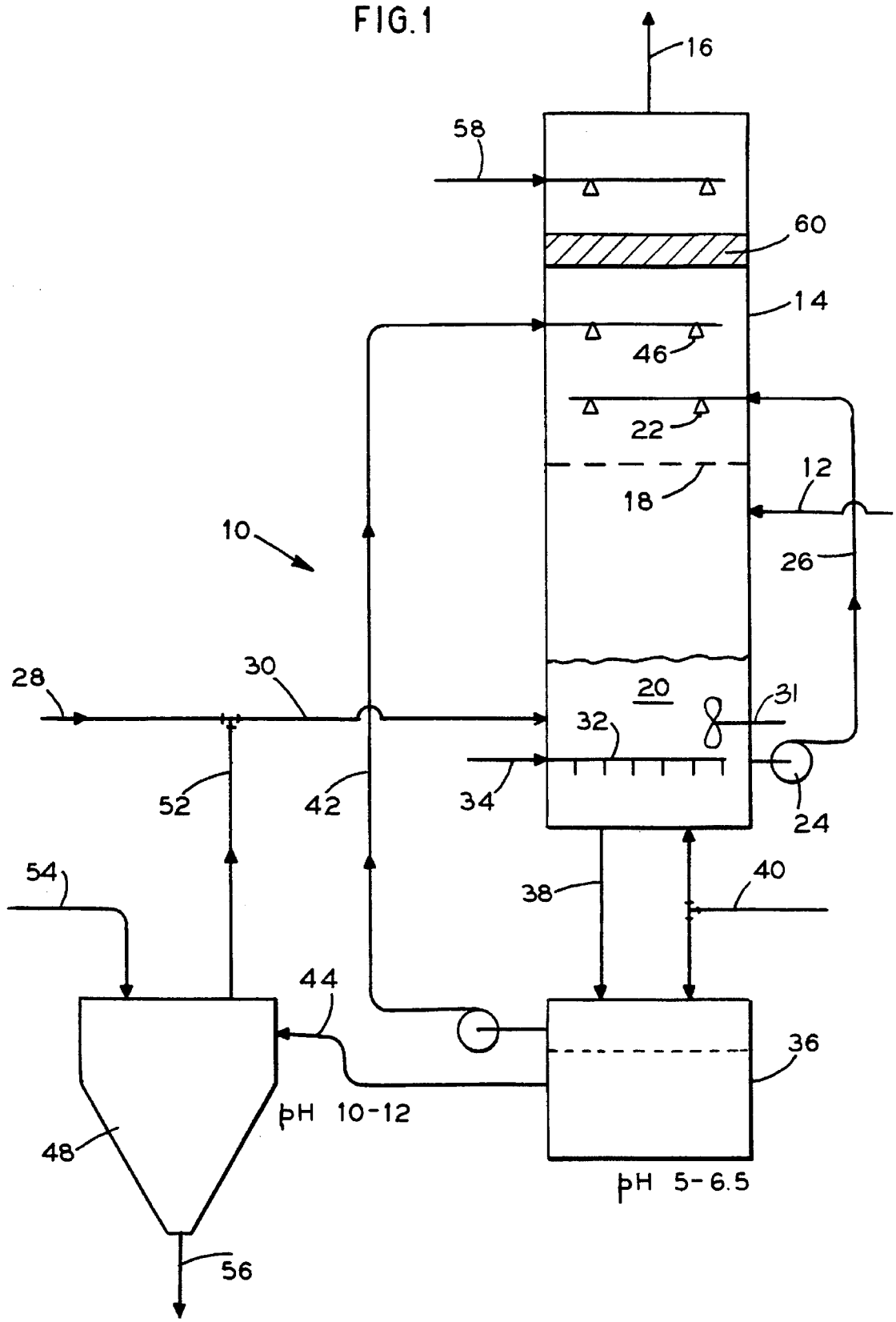
FIG. 1 is a schematic diagram of a typical process contemplated by this invention wherein both a calcium and an ammonia based reagent are supplied a scrubber tower at different stages and in which forced oxidation occurs.

Referring to FIG. 1, wet flue gas desulfurization (FGD) process 10 is illustrated wherein a sulfur containing flue gas 12 is introduced into scrubber tower 14. This flue gas 12 may be formed during the combustion of fossil fuels (coal, oil, petroleum coke, etc.) and/or waste materials which are burned by electric power generating plants, refuse-to-energy plants and other industries. Most of the sulfur contained within flue gas 12 (i.e. about 95%) is in the form of sulfur dioxide ($SO_2$) which is removed within tower 14. The cleaned, lean scrubber flue gas 16 leaving tower 14 is generally in a saturated condition.

In this embodiment, tower 14 is an up-flow gas contact device which may or may not incorporate one or more perforated trays 18 or other such static gas/liquid contact means therein. (Should tower 14 include a tray, it is usually referred to as a tray tower whereas if tower 14 does not include such a tray, it is usually referred to as a spray tower.) Tower 14 may also be a single loop tower wherein the same slurry from the same absorber is recirculated in the same tower/towers or tower 14 may be of a dual loop design wherein two separate slurry streams from the tower are either taken at different locations resulting in different compositions or the separate slurry streams are recirculated to different locations within tower 14. FIG. 1 is an illustration of the latter dual-loop design wherein tray 19 basically separates tower 14 into upper and lower stages.

As shown, a liquid bottoms product 20 collects in the bottom of tower 14. This liquid bottoms product 20 generally contains unspent reagent reaction products along with any contaminants removed from flue gas 12. In most cases, this liquid bottoms product 20 is recirculated to atomizers 22 in tower 14 via pump 24 and line 26. Such recirculation permits this unused or under utilized reagent to be redirected upon flue gas 12 for additional contaminant removal and for greater efficiency and reagent utilization in the FGD process. This all occurs in the lower stage of tower 14.

One reagent added to tower 14 is soluble ammonia 28. This ammonia is supplied either directly to liquid bottoms product 20 in the lower stage of tower 14 via line 30 or to the upper stage of tower 14 via line 42 for spraying onto tray 19. The presence of soluble ammonia 28 in tower 14 promotes $SO_2$ removal in much the same manner as is accomplished in sodium or magnesium based FGD systems. Such soluble ammonia 28 removes sulfur oxides, including $SO_2$ and $SO_3$, and ultimately forms ammonia sulfate $[(NH_4)_2SO_4]$. Many different forms of ammonia are essentially suitable for this use including ammonia, ammonium hydroxide, ammonium sulfite, ammonium bisulfite, urea or other amines.

As indicated, ammonia 28 is injected into tower 14 through either line 30 or line 33 (the latter being coupled to line 42 as shown). In the upper stage of tower 14, such ammonia ($NH_3$) is captured by tray 19 and recirculated after $SO_2$ absorption has occurred via line 39 back to auxiliary tank 37. Supplemental make-up ammonia is delivered to tank 37 via line 35 as needed. To help accomplish this cross-current liquid flow, different types of trays 19 can be implemented such as baffled sieve plate, bubble caps, or the like.

The ammonia delivered via line 30 to the lower stage of tower 14 is generally recirculated via pump 24 and line 26 and sprayed onto the incoming flue gas 12 via atomizers 22. However, this bottom section or stage predominantly utilizes calcium based reagent 40 for scrubbing (as will be explained below) whereas the upper stage predominantly utilizes ammonia 28 for scrubbing. Thus, there are at least two separate recirculating systems occurring with respect to tower 14, the first recirculates ammonia 28 via feed tank 37 and tray 19 in the upper stage while the other recirculates calcium based reagent 40 via pump 24 and atomizers 22 in the lower stage. Such calcium based reagent 40 being sprayed onto tray 18 as shown.

As stated above, the different stages of this staged tower can be said to be separated by tray 19 which returns the captured ammonia back to feed tank 37 after $SO_2$ absorption has occurred. Tray 19 is positioned just above atomizers 22 in lower stage of tower 14. These atomizers 22 spray bottoms product 20 onto flue gas 12 and tray 18.

Such an arrangement increases the $SO_2$ removal efficiencies of 95% or more by using an ammonia additive in lime/limestone scrubbing at higher pH levels (i.e. about 5.5–6.0) instead of the lower pH levels (i.e. about 4.0–5.0) for buffered systems using organic additives in a tray tower. This is accomplished by using a lower liquid/gas ratio which is ideal for retrofit considerations.

Furthermore, the end by-product of tower 14 can easily be marketed if agricultural farm land is in close proximity.

Forced oxidation system 32 in tower 14 is submerged within liquid bottoms product 20 and may consist of an air sparger and mixer 31 or the like. Air 34 is supplied oxidation system 32 and forced into liquid bottoms product 20 in order to cause any sulfite ($SO_3^=$) or bisulfite ($HSO_3^-$) therein to convert to or be transformed into sulfate ($SO_4^=$). The sulfate subsequently reacts with any unused reagent (such as ammonia 28 referred to above) in bottoms product 20 so that it may be removed from FGD process 10.

After oxidation, a portion of the liquid bottoms product 20 is delivered to primary dewatering process 36 via line 38. Also added to dewatering process 36, is a second reagent, i.e. calcium based reagent 40, which usually consists of limestone due to its lower cost but can also consist of lime, slaked lime or the like. It is within dewatering process 36 that any liquid therein 42 is separated from any remaining slurry/solid 44. Alternatively, calcium based reagent 40 may be added directly to tower 14 where it is mixed with bottoms product 20.

Due to the addition of this second calcium based reagent 40, liquid slurry 42 will contain ammonia, carbonate, and sulfur species, (sulfite, but mostly sulfate). Liquid 42, which contains reagents therein, is recycled back to the upper stage of tower 14 and sprayed upon the incoming flue gas 12 via atomizers 46 much the same as bottoms product 20 was recycled in the lower stage and sprayed by atomizers 22. Other alternatives regarding the use and/or disposal of liquid 42 may also exist.

Thus, the calcium based reagent 40 is either directly or indirectly introduced into tower 14 and is sprayed above trays 18 and 19 along with any ammonia using standard or typical atomizers 46. This calcium based reagent 40 reacts with the absorbed sulfur dioxide in flue gas 12 in the lower stage to form calcium sulfate ($CaSO_4.2H_2O$ or gypsum) thereby enabling such captured sulfur to be removed from the flue gas. Furthermore, other sulfite products subsequently react with any unused calcium or ammonia collected in the bottom of tower 14 thereby further increasing sulfur removal from tower 14. Such forced oxidation promotes the formation of gypsum ($CaSO_4.2H_2O$) crystals in both bottoms product 20 and slurry/solid stream 44.

The concentrated slurry/solid 44 collected in primary dewatering process 36 will generally consist of ammonia sulfate $[(NH_4)_2SO_4]$, ammonia sulfite, calcium sulfate ($CaSO_4.2H_2O$ or gypsum), calcium carbonate ($CaCO_3$ or limestone), and other inerts such as magnesium or silica compounds present in the limestone feed. This slurry/solid stream 44 is delivered, as indicated, to a separate tank 48 for further or subsequent concentration and removal of ammonium sulfate and/or gypsum. Generally this separate tank or secondary dewatering stage 48 operates at a higher pH than primary dewatering process 36. (Tank 48 generally operates with a pH range of from 10 to 12 while primary dewatering process 36 operates in a pH range of from 5 to 6.5.) Lime 54 is added to tank 48 in order to promote this higher pH crystallization in tank 48 and to further increase ammonia recovery. Thus, stream 44 can be concentrated so that ammonia is recovered and returned to tower 14 via line 52. As a result, the final by-product 56 of process 10 will usually contain ammonium sulfate and gypsum in slurry form which is disposed of as a fertilizer stream. Alternatively, oxidized bottoms product 20 in slurry form can be used as directly applied wet fertilizer or dried to produce a solid fertilizer product.

Primary dewatering process 36 generally consists of simple solid/liquid separation equipment such as hydroclones located outside tower 14. This equipment is used to separate and concentrate the gypsum and the ammonium sulfate contained within slurry/solid 44 from the carbonate overflow contained within liquid stream 42 with this liquid overflow 42 being recirculated back to tower 14 thereby reducing or eliminating the need for settling tanks. Calcium based reagent 40 is added prior to such recirculation of the overflow from primary dewatering process 36.

Thus, by utilizing both ammonia 28 and calcium based reagent 40 in the different stages of tower 14, in addition to forced oxidation system 32 in the bottom of tower 14, a resultant fertilizer final product 56 can be produced which is useful in agriculture as either a soil stabilizer or as a fertilizer. Additionally, product stream 56 can be further processed in a separate crystalizer and pelletizer into a dry fertilizer consisting of gypsum and ammonium sulfate. Furthermore, the quantity of ammonia 28 and limestone reagent 40 supplied to tower 14 can be controlled for maximum absorption reaction.

As stated earlier, cleaned flue gas 16 exits tower 14 but prior to doing so, it is washed with a water/dilute sulfuric acid stream 58 to further reduce any particulates and eliminate any ammonia vapor that may carry over from mist eliminators 60. Also, the solution collected in mist eliminators 60 can be used as make-up water recycled back to tower 14.

The advantages of combining ammonia 28 with calcium based reagent 40 include a very high $SO_2$ removal rate from flue gas 12 (generally 95% or more); less corrosion within tower 14 due to the pH being maintained between 5.0 to 6.5; less blowdown required to maintain a steady state closed loop condition; and a lower liquid/gas ratio within tower may be used (compared to a ratio normally associated with lime/limestone slurry or solution scrubbing), even though the calcium source is limestone. Furthermore, such a countercurrent tower 14 is more efficient to operate since, normally, no additional catalyst need be supplied for desulfurization. In most cases, the neutralizing reagents (calcium oxide or limestone) are added to a grinding mill (not shown) where they are finely ground such that 80% or more pass through a 200 mesh.

Alternatives to process 10 may utilize potassium hydroxide in place of ammonia 28 as the absorption medium. In this case, the final by-product would be a potassium sulfate fertilizer which can also be used for agricultural purposes.

Ideally, process 10 would incorporate perforated trays 18 with an open area of between 5 and 60%. The gas velocity flowing through trays 18 would be in excess of 5 feet/sec. for increased absorption to occur. Additionally, the forced oxidation would be carried out at an optimum lower pH range of 5.0–6.5, thereby enhancing absorption and minimizing ammonia loss in exiting flue gas 16. This pH range will also greatly minimize the corrosion of the material normally encountered in a limestone forced oxidation process utilizing ammonia.

As can be seen from the above, the bulk of the scrubbing is achieved in the lower stage of tower 14 which utilizes calcium based reagent 40 having a L/G typically in the range of from 40–80 for high inlet concentrations of about 3000 to 8000 PPM of $SO_2$. However, dilute phase circulating ammonia 28 is utilized in the upper stage of tower 14 having a low L/G range of about 5–15 for gas phase mass transfer. The ammonia 28 that circulates in the lower stage further enhances dissolved alkalinity as well as minimizes the creation and/or collection of scale at high $SO_2$ inlet. A higher pH ammonia operation, i.e. one in the range of about 5.5 to 6.5, will improve reliability.

Also, the loss of ammonia 28 in the blowdown is held to a minimum, as compared to double alkali natural oxidation, due to gypsum forced oxidation and the ammonium sulfate having high solid separation in secondary dewatering stage 48. The solid separation normally associated with the double alkali natural oxidation method is in the range of about 35–45% whereas such separation associated with the present process is about 80%.

In the above described embodiment, the following concentration ranges will be typical:
(a) Lower stage, slurry:
3–5 moles active ammonia/100 moles water;
0.5–8 moles ammonium sulfate/100 moles water;
(b) Upper stage, liquid:
0.1–1 moles active ammonia/100 moles water;
0.1–3 moles ammonium sulfate/100 moles water.
Of course, the $SO_2$ concentration in the liquid depends upon inlet concentration of the gas, vapor liquid equilibrium and temperature.

What is claimed is:

1. A method of wet flue gas desulfurization comprising the steps of:
   (a) passing a sulfur containing flue gas through a scrubber tower having upper and lower zones separated by a perforated tray;
   (b) injecting an ammonia based liquid reagent into said upper zone of said scrubber tower for desulfurization in said upper zone via said ammonia based liquid reagent;
   (c) collecting a bottoms product in a lower region of said scrubber tower;
   (d) forcibly oxidizing said bottoms product, thereby forming gypsum and ammonium sulfate compounds;
   (e) supplying a calcium based reagent to said forcibly oxidized bottoms product;
   (f) recycling said oxidized bottoms product from said lower region of said scrubber tower and spraying same onto the flue gas for desulfurization in said lower zone of said tower via said calcium based reagent;
   (g) delivering a portion of said oxidized bottoms product to a primary dewatering assembly;
   (h) generating a liquid stream in said primary dewatering assembly containing un-used or under-used said ammonia based reagent and said calcium based reagent and a separate solid/slurry stream containing gypsum and ammonium sulfate compounds;
   (i) returning said liquid stream to said tower and spraying same onto the flue gas for desulfurization in both said upper and lower zones of said tower; and,
   (j) concentrating said solid/slurry stream in a secondary dewatering assembly for the subsequent removal therefrom of said gypsum and ammonium sulfate compounds.

2. The method as set forth in claim 1 further comprising the step of supplying a lime or limestone based reagent to said scrubber tower or to said primary dewatering assembly.

3. The method as set forth in claim 2 further comprising the step of varying the amount of said ammonia based reagent supplied to said scrubber tower thereby controlling the amount of ammonium sulfate removed from said secondary dewatering assembly.

4. The method as set forth in claim 2 further comprising the step of varying the amount of said calcium based reagent supplied to said scrubber tower thereby controlling the amount of calcium hydroxide or calcium carbonate in said solid/slurry stream.

5. The method as set forth in claim 2 further comprising the step of maintaining a pH in said scrubber tower in the range of from 5.0 to 6.5.

6. The method as set forth in claim 2 further comprising the step of perforating said tray so as to have an open area of from 5 to 60%.

7. The method as set forth in claim 2 further comprising the step of dewatering said oxidized bottoms product in a hydroclone.

8. The method as set forth in claim 2 further comprising the step of effectively concentrating said slurry/solid stream in two separate dewatering assemblies having two different pH ranges.

9. The method as set forth in claim 2 further comprising the step of using said concentrated gypsum and ammonia sulfate compounds for fertilizer or soil stabilizer purposes.

10. The method as set forth in claim 2 further comprising the step of capturing said ammonia based liquid reagent in said tray and returning a portion thereof to a separate ammonia feed tank.

11. The method as set forth in claim 10 further comprising the step of supplying additional said ammonia based liquid reagent to said feed tank as required.

12. The method as set forth in claim 11 further comprising the step of injecting said ammonia based liquid reagent from said feed tank into said liquid stream and returning same to said scrubber tower for spraying onto said tray.

\* \* \* \* \*